(12) United States Patent
Inuzuka et al.

(10) Patent No.: US 10,384,425 B2
(45) Date of Patent: Aug. 20, 2019

(54) REINFORCING BASE FABRIC FOR URETHANE-FOAMED PRODUCT

(71) Applicants: TOYOTA BOSHOKU KABUSHIKI KAISHA, Aichi-ken (JP); MOLD TECHNICAL OFFICE CO., LTD., Kanagawa-ken (JP); VALUTEC INTERNATIONAL INC., Tokyo (JP)

(72) Inventors: Kensuke Inuzuka, Aichi-ken (JP); Yoshiyuki Murata, Aichi-ken (JP); Toshio Iwasawa, Kanagawa (JP); Jun Yamagami, Tokyo (JP)

(73) Assignees: TOYOTA BOSHOKU KABUSHIKI KAISHA, Aichi-Ken (JP); MOLD TECHNICAL OFFICE CO., LTD., Kanagawa-Ken (JP); VALUTEC INTERNATIONAL INC., Tokyo (JP)

( * ) Notice: Subject to any disclaimer, the term of this patent is extended or adjusted under 35 U.S.C. 154(b) by 345 days.

(21) Appl. No.: 15/003,079

(22) Filed: Jan. 21, 2016

(65) Prior Publication Data

US 2016/0214358 A1     Jul. 28, 2016

(30) Foreign Application Priority Data

Jan. 22, 2015  (JP) .................................. 2015-010045

(51) Int. Cl.
*B32B 27/06* (2006.01)
*B32B 5/02* (2006.01)
(Continued)

(52) U.S. Cl.
CPC ............ *B32B 27/065* (2013.01); *B32B 5/022* (2013.01); *B32B 5/06* (2013.01); *B32B 5/08* (2013.01);
(Continued)

(58) Field of Classification Search
CPC ........... B32B 27/065; B32B 5/06; B32B 5/08; B32B 5/22; B32B 5/245; B32B 27/40;
(Continued)

(56) References Cited

U.S. PATENT DOCUMENTS

2007/0166527 A1   7/2007   Yabe et al.
2015/0266263 A1   9/2015   Ichikawa

FOREIGN PATENT DOCUMENTS

CN       1898148       1/2007
CN     101970227       2/2011
(Continued)

OTHER PUBLICATIONS

Machine Translation of JP 2007-301775. (Year: 2007).*
(Continued)

*Primary Examiner* — Brian Handville
(74) *Attorney, Agent, or Firm* — Greenblum & Bernstein, P.L.C.

(57) ABSTRACT

A reinforcing base fabric for an urethane-foamed product includes: a front surface layer and a rear surface layer formed of a fiber integration of a thermoplastic resin; and an intermediate layer formed of a foam and interposed between the front surface layer and the rear surface layer. The total weight per unit area ranges from 90 g/m$^2$ to 260 g/m$^2$. The front surface layer is formed of a fiber integration having a weight per unit area of equal to or greater than 20 g/m$^2$. The rear surface layer is formed of a fiber integration having a weight per unit area of equal to or greater than 30 g/m$^2$. The intermediate layer is formed of a foam layer having a weight per unit area of 30 g/m$^2$ to 100 g/m$^2$.

3 Claims, 1 Drawing Sheet

(51) Int. Cl.
  *B32B 5/18* (2006.01)
  *B32B 27/40* (2006.01)
  *B32B 5/06* (2006.01)
  *B32B 5/08* (2006.01)
  *B32B 5/22* (2006.01)
  *B32B 5/24* (2006.01)

(52) U.S. Cl.
  CPC .............. *B32B 5/18* (2013.01); *B32B 5/22* (2013.01); *B32B 5/245* (2013.01); *B32B 27/40* (2013.01); *B32B 2250/03* (2013.01); *B32B 2260/021* (2013.01); *B32B 2260/023* (2013.01); *B32B 2260/046* (2013.01); *B32B 2262/02* (2013.01); *B32B 2262/0246* (2013.01); *B32B 2262/0253* (2013.01); *B32B 2262/0276* (2013.01); *B32B 2262/12* (2013.01); *B32B 2262/14* (2013.01); *B32B 2266/0278* (2013.01); *B32B 2305/022* (2013.01); *B32B 2305/22* (2013.01); *B32B 2307/102* (2013.01); *B32B 2307/554* (2013.01); *B32B 2307/718* (2013.01); *B32B 2307/734* (2013.01); *B32B 2601/00* (2013.01); *B32B 2605/00* (2013.01); *B32B 2605/003* (2013.01)

(58) Field of Classification Search
  CPC ..... B32B 5/022; B32B 5/18; B32B 2307/734; B32B 2307/554; B32B 2307/102; B32B 2260/023; B32B 2250/03; B32B 2605/00; B32B 2307/718; B32B 2262/0253; B32B 2262/0276; B32B 2262/12; B32B 2262/14; B32B 2260/046; B32B 2262/0246; B32B 2605/003; B32B 2601/00; B32B 2260/021; B32B 2266/0278; B32B 2305/022; B32B 2305/22; B32B 2262/02
  See application file for complete search history.

(56) References Cited

FOREIGN PATENT DOCUMENTS

| CN | 103781955 | 5/2014 | |
|----|-----------|--------|---|
| DE | 2253323 | 5/1974 | |
| GB | 1443754 | 7/1976 | |
| JP | 2003-183965 | 7/2003 | |
| JP | 2004-353153 | 12/2004 | |
| JP | 2005-212204 | 8/2005 | |
| JP | 2006-341243 | 12/2006 | |
| JP | 2007-301775 | 11/2007 | |
| JP | 2008-044160 | 2/2008 | |
| JP | 2009-154350 | 7/2009 | |
| WO | 2013-158182 | 10/2013 | |
| WO | WO-2013176176 A1 * | 11/2013 | ............... A47C 7/20 |

OTHER PUBLICATIONS

Chinese Office Action for counterpart CN App. No. 201610044693.3 dated Sep. 27, 2017, along with English-language translation thereof.

Office Action issued in CHINA Counterpart Patent Appl. No. 201610044693.3, dated Aug. 14, 2018, along with an english translation thereof.

Chinese Office Action for counterpart CN App. No. 201610044693.3 dated Apr. 16, 2018, along with English-language translation thereof.

Office Action issued in JAPAN Counterpart Patent Appl. No. 2015-010045, dated Aug. 7, 2018, along with an english translation thereof.

Office Action issued in CHINA Counterpart Patent Appl. No. 201610044693.3, dated Nov. 13, 2018, along with an english translation thereof.

Office Action issued in Germany Counterpart Patent Appl. No. 102016200852.8, dated Apr. 26, 2019, along with an English translation thereof.

\* cited by examiner

REINFORCING BASE FABRIC FOR URETHANE-FOAMED PRODUCT

CROSS-REFERENCE TO RELATED APPLICATION

This application claims priorities from Japanese Patent Application No. 2015-010045 filed on Jan. 22, 2015, the entire subject matters of which is incorporated herein by reference.

TECHNICAL FIELD

The present disclosure relates to a reinforcing base fabric for an urethane-foamed product which is used for a vehicle seat.

BACKGROUND

A soft urethane-foamed product is often used as a cushion member of a vehicle seat. The urethane-foamed product is acquired as a single molded product by disposing a reinforcing base fabric on a cavity surface of an urethane-foaming mold having a three-dimensional cavity, injecting an urethane-foaming crude liquid as a raw material into the mold, and foaming the urethane-foaming crude liquid under heating. The reinforcing base fabric is disposed on a rear surface opposite to a surface of the urethane-foamed product on which an occupant sits. The urethane-foamed product is attached to a seat frame such that the reinforcing base fabric comes in contact with a metal spring attached to the seat frame. The reinforcing base fabric has a function of preventing the urethane-foamed product from coming in direct contact with the metal spring and locally receiving a force to cause a crack or the like and preventing abrasion or noise due to friction or the like and enhances durability of the urethane-foamed product.

In the technique described in JP-A-2004-353153, a nonwoven fabric stacked body having a three-layered structure is employed as a reinforcing base fabric. A front surface layer as a top surface is impregnated with injected liquid urethane material and serves to be well bonded to a urethane-foamed product after the foaming. A rear surface layer as a bottom surface serves to provide a reinforcing effect based on fiber strength and to prevent noise from being generated due to friction with a metal spring. An intermediate layer serves to block the injected liquid urethane material so as not to permeate into the rear surface layer.

In the technique described in JP-A-2004-353153, when a fiber density per unit area of the nonwoven fabric of the intermediate layer is uneven, the injected liquid urethane material may permeate to the surface, which is a bottom surface of the rear surface layer, coming in contact with the metal spring and may cause generation of noise. When the thickness of the nonwoven fabric of the intermediate layer increases to prevent permeation of the urethane material, it is difficult to grow and thus followability of a mold shape in foaming urethane degrades. Accordingly, there is a possibility that breakage or formation of a crease will be caused.

SUMMARY

The present disclosure is made in consideration of the above-mentioned circumstances, and one of objects of the present disclosure is to provide a reinforcing base fabric which is a stacked body having a three-layered structure and in which noise can be prevented from being generated by friction with a metal spring or the like due to permeation of an urethane material and breakage or creases are not easily generated.

According to an illustrative embodiment of the present disclosure, there is provided a reinforcing base fabric for an urethane-foamed product including: a front surface layer and a rear surface layer formed of a fiber integration of a thermoplastic resin; and an intermediate layer formed of a foam and interposed between the front surface layer and the rear surface layer, wherein the total weight per unit area ranges from 90 g/m² to 260 g/m², wherein the front surface layer is formed of a fiber integration having a weight per unit area of equal to or greater than 20 g/m², wherein the rear surface layer is formed of a fiber integration having a weight per unit area of equal to or greater than 30 g/m², and wherein the intermediate layer is formed of a foam layer having a weight per unit area of 30 g/m² to 100 g/m².

DETAILED DESCRIPTION

Figure 1:
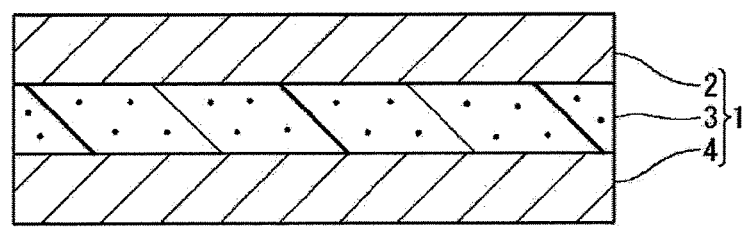
FIG. 1 is a cross-sectional view of a reinforcing base fabric for an urethane-foamed product according to an embodiment of the present disclosure.
Figure 2:
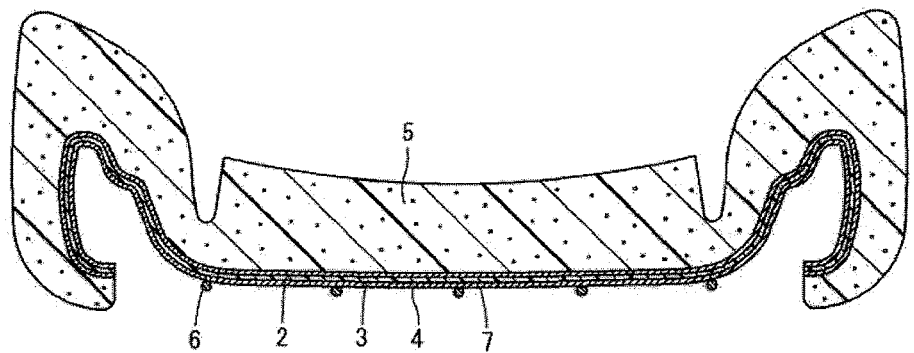
FIG. 2 is a cross-sectional view of an urethane-foamed product using the reinforcing base fabric for an urethane-foamed product according to the embodiment.

FIGS. 1 and 2 illustrate an embodiment of the present disclosure. A reinforcing base fabric 1 for an urethane-foamed product is a cloth-like member having a three-layered structure in which two layers of a front surface layer 2 and a rear surface layer 4 formed of a fiber integration of thermoplastic resin and an intermediate layer 3 formed of a foam and interposed between the front surface layer 2 and the rear surface layer 4 are integrated. The total weight per unit area of the reinforcing base fabric 1 for an urethane-foamed product ranges from 90 g/m2 to 260 g/m2, the weight per unit area of the front surface layer 2 is equal to or greater than 20 g/m2, the weight per unit area of the rear surface layer 4 is equal to or greater than 30 g/m2, and the weight per unit area of the intermediate layer 3 ranges from 30 g/m2 to 100 g/m2.

The total available weight per unit area of the reinforcing base fabric 1 for an urethane-foamed product slightly differs depending on the processing method. In a sewing method of cutting the reinforcing base fabric 1 for an urethane-foamed product into a predetermined shape and sewing the reinforcing base fabric using a sewing machine into a stereoscopic shape, the total weight per unit area of the reinforcing base fabric 1 for an urethane-foamed product may range from 90 g/m2 to 260 g/m2 and preferably ranges from 110 g/m2 to 200 g/m2. When the reinforcing base fabric 1 for an urethane-foamed product is excessively thick, it is difficult to sew a fine part in which the reinforcing base fabric 1 for an urethane-foamed product need to be overlapped and sewn and thus the total weight per unit area is preferably equal to or less than 260 g/m2. When the reinforcing base fabric 1 for an urethane-foamed product is excessively thin, the fixability to an urethane pad layer 5 degrades or a function of preventing noise from being generated by friction with a metal spring degrades. The shape retainability of the reinforcing base fabric 1 for an urethane-foamed product which is formed in a stereoscopic shape by the sewing degrades and it is difficult to store or transfer the stacked reinforcing base fabrics or to set the reinforcing base fabric into an urethane-foaming mold. Accordingly, the total weight per unit area of the reinforcing base fabric 1 for an urethane-foamed product should be set to be equal to or greater than 90 g/m2.

When a heating and molding method such as preliminary molding before foaming urethane or direct molding using an urethane-foaming mold is used, the total weight per unit area of the reinforcing base fabric 1 for an urethane-foamed product may range from 90 g/m2 to 240 g/m2 and preferably ranges from 110 g/m2 to 200 g/m2. In the heating and molding method, since there is a part in which the reinforcing base fabric 1 for an urethane-foamed product is overlapped and fused, the total weight per unit area is preferably set to be equal to or less than 240 g/m2. Since the reinforcing base fabric 1 for an urethane-foamed product becomes thinner and is hardened by fusion of fibers by being heated and pressurized, the total weight per unit area needs to be set to be equal to or greater than 90 g/m2.

The weight per unit area of the front surface layer 2 may range from 20 g/m2 to 100 g/m2, because the fiber integration of the front surface layer 2 and the urethane pad layer 5 need to be fixed to each other after the liquid urethane material is foamed. A short fiber integration with a weight per unit area of less than 20 g/m2 has very small tensile strength and is broken in an integration process for forming a three-layered structure, and thus cannot be used. The thickness of a thermoplastic resin fiber which is used for the front surface layer 2 is not particularly limited and 2 denier to 30 denier fibers can be used. As the thermoplastic resin fiber which is used for the front surface layer 2, a fiber using a thermoplastic resin with a high melting point can be preferably used so as to suppress thermal deformation in foaming the liquid urethane material, and representative examples thereof include polyester fiber, acrylic fiber, acryl-based fiber, and polypropylene fiber. Particularly, since the polyester fiber has various kinds of goods, is produced in mass, and is available at relatively low costs, the polyester fiber can be preferably used. The shape of the thermoplastic resin fiber which is used for the front surface layer 2 may be any of a short fiber and a long fiber, but the short fiber is more preferable because the fiber integration has sufficient extensibility, there is a small difference in extensibility between a longitudinal direction and a lateral direction, the unevenness in thickness is small, and the like. By using a crimped fiber, bulkiness based on crimps are provided and thus the front surface layer 2 can be satisfactorily fixed to the urethane pad layer 5 after the liquid urethane material is foamed.

A fiber using a thermoplastic resin with a low melting point may be mixed into the front surface layer 2 so as to heat and mold the reinforcing base fabric 1 for an urethane-foamed product, and representative examples thereof include polyethylene fibers (for example, a high-density polyethylene fiber with a melting point of 132° C., a low-density polyethylene fiber with a melting point of 117° C., a ultralow-density polyethylene fiber with a melting point of 98° C., and a straight low-density polyethylene fiber with a melting point of 128° C.) and polypropylene fibers (for example, random polypropylene copolymer fibers with a melting point of 135° C. to 150° C.). Fibers having a core-sheath structure (for example, a fiber in which a core is formed of a polyester resin and a sheath is formed of a polyethylene resin or a copolymerized polyester resin) or a side-by-side structure (for example, a fiber in which one side in a cross-section is formed of a polyester resin and the other side is formed of a polyethylene resin), that is, bi-component fibers, can be used. The bi-component fiber has a component with a low melting point and has crimps or exhibits crimps by heating, and thus can be used more preferably. The mixing ratio (weight base) of a resin fiber with a high melting point and a resin fiber with a low melting point can range from 70% /30% to 30%/70% and more preferably range from 60%/40% to 40%/60%. When the proportion of the resin fiber with a low melting point is less than 30%, a fusing force between fibers is small and thus molding thereof is not possible. When the proportion of the resin fiber with a low melting point is greater than 70%, fibers are excessively fused to each other, the liquid urethane material less permeates, and thus the fixing strength between the front surface layer 2 and the urethane pad layer 5 decreases.

The rear surface layer 4 is disposed such that the bottom surface thereof comes in contact with a metal spring 6. The weight per unit area of the rear surface layer 4 can range from 30 g/m$^2$ to 190 g/m$^2$. In order to prevent noise due to friction with the metal spring 6 or to reduce abrasion, a weight per unit area of 30 g/m$^2$ or more is required. Preferably, the weight per unit area is 40 g/m$^2$ or more. When a resin fiber with a low melting point is mixed to use the heating and molding method, the weight per unit area can be 30 g/m$^2$ and preferably 50 g/m$^2$ or more. When the weight per unit area is less than 30 g/m$^2$, a place in which the intermediate layer 3 comes in direct contact with the metal spring 6 may be formed due to unevenness in thickness of the fiber integration and noise due to friction may be generated in the place. When the mixing ratio (weight base) of the resin fiber with a high melting point and the resin fiber with a low melting point can be set to range from 70%/30% to 30%/70% and preferably from 60%/40% to 40%/60%. When the proportion of the resin fiber with a low melting point is less than 30%, the fusing force between fibers is small and thus molding thereof is not possible. When the proportion of the resin fiber with a low melting point is greater than 70%, there is a possibility that fibers will be excessively fused to each other to be hardened and a problem with generation of noise or generation of a bottoming feeling will occur. The fiber integration of the rear surface layer 4 may have a fiber architecture different from the fiber integration of the front surface layer 2, but preferably has the same fiber architecture as the fiber integration of the front surface layer 2.

The intermediate layer 3 has a function of preventing permeation of the liquid urethane material in foaming the liquid urethane material. The intermediate layer 3 is a foam having open cells with a weight per unit area of 30 g/m$^2$ to 100 g/m$^2$ and is preferably a polyurethane-foamed sheet material (hereinafter, referred to as a slab urethane sheet). The weight per unit area of the slab urethane sheet is preferably 30 g/m$^2$ or more, which can satisfactorily prevent permeation of the urethane material. When the weight per unit area of the slab urethane sheet is greater than 100 g/m$^2$, there occurs a problem in that needle breakage is often caused in needle punching equipment in integrating two layers of the front surface layer 2 and the rear surface layer 4 and the intermediate layer 3 using a needle punching method. In the sewing method, a slab urethane sheet with a weight per unit area of 30 g/m$^2$ to 100 g/m$^2$ can be used and the weight per unit area preferably ranges from 30 g/m$^2$ to 70 g/m$^2$. In the heating and molding method, since there is a part in which the reinforcing base fabric 1 for an urethane-foamed product is folded and fused, the weight per unit area of the slab urethane sheet can range from 30 g/m$^2$ to 80 g/m$^2$ and preferably from 30 g/m$^2$ to 70 g/m$^2$. As the foam, sheet materials such as a polyolefin foam, an EVA foam (a foam using an ethylene-vinyl acetate copolymer resin as a raw material), and a rubber-based foam can be used in addition to the slab urethane sheet.

The reinforcing base fabric 1 for an urethane-foamed product having a three-layered structure in which the front surface layer 2, the intermediate layer 3, and the rear surface layer 4 are integrated is obtained by interlacing the three layers using a needle punching method or a high-pressure water current method (for example, see JP-A-2005-212204). From the viewpoint of productivity, the needle punching method can be preferably used. A reinforcing base fabric 7 which is formed in a stereoscopic shape by cutting and sewing the reinforcing base fabric 1 for an urethane-foamed product obtained in this way in a predetermined shape is set into an urethane-foaming mold and a liquid urethane material is injected into the mold and is foamed. Accordingly, it is possible to obtain an urethane-foamed product in which the urethane material does not permeate out and generation of noise is suppressed. When a resin fiber with a low melting point is mixed into the fiber integration of the front surface layer 2 and the rear surface layer 4 of the reinforcing base fabric 1 for an urethane-foamed product, the reinforcing base fabric 1 for an urethane-foamed product can be shaped in a stereoscopic shape without performing the sewing. That is, in one method, the reinforcing base fabric 7 which is formed in a stereoscopic shape by heating and molding the reinforcing base fabric 1 for an urethane-foamed product in preliminary molding before foaming the urethane material is set into an urethane-foaming mold and a liquid urethane material is injected thereinto and is foamed. In another method, the reinforcing base fabric 1 for an urethane-foamed product is directly set into an urethane-foaming mold and is heated and molded, and then a liquid urethane material is injected thereinto and is foamed. Even when any of the two methods is used, it is possible to obtain an urethane-foamed product with creases less formed in the reinforcing base fabric 7.

Hereinafter, the present disclosure will be described with reference to examples. In examples and comparative examples, the resin fiber with a high melting point which is used for the front surface layer 2 and the rear surface layer 4 is a polyester short fiber (with a melting point of 260° C., which is made by Teijin Limited) with a thickness of 2.2 denier and a fiber length of 2 inches. The resin fiber with a low melting point is a bi-component short fiber (with a melting point of 110° C. in a core, which is made by Huvis Corporation) with a thickness of 2.2 denier and a fiber length of 2 inches in which a polyethylene terephthalate resin is used as a raw material for the core and a copolymerized polyethylene terephthalate resin is used as a raw material for a sheath. The foam used for the intermediate layer 3 is a slab urethane sheet of open cells (which is made by Achilles Corporation).

EXAMPLE 1

A slab urethane sheet with a weight per unit area of 30 g/m$^2$ as the intermediate layer 3 is stacked on a nonwoven fabric as the rear surface layer 4 which is a fiber integration with a weight per unit area of 50 g/m$^2$ using 50 wt % of a polyester short fiber and 50 wt % of a bi-component short fiber fabricated by a carding machine as a raw material, and a nonwoven fabric with a weight per unit area of 20 g/m$^2$ as the front surface layer 2 using 50 wt % of the same polyester short fiber and 50 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 100 g/m$^2$ is obtained (Table 1).

EXAMPLE 2

A slab urethane sheet with a weight per unit area of 30 g/m$^2$ as the intermediate layer 3 is stacked on a nonwoven fabric as the rear surface layer 4 which is a fiber integration with a weight per unit area of 50 g/m$^2$ using 50 wt % of a polyester short fiber and 50 wt % of a bi-component short fiber fabricated by a carding machine as a raw material, and a nonwoven fabric with a weight per unit area of 30 g/m$^2$ as the front surface layer 2 using 50 wt % of the same polyester short fiber and 50 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 110 g/m$^2$ is obtained (Table 1).

EXAMPLE 3

A slab urethane sheet with a weight per unit area of 30 g/m$^2$ as the intermediate layer 3 is stacked on a nonwoven fabric as the rear surface layer 4 which is a fiber integration with a weight per unit area of 30 g/m$^2$ using 50 wt % of a polyester short fiber and 50 wt % of a bi-component short fiber fabricated by a carding machine as a raw material, and a nonwoven fabric with a weight per unit area of 30 g/m$^2$ as the front surface layer 2 using 50 wt % of the same polyester short fiber and 50 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 90 g/m$^2$ is obtained (Table 1).

EXAMPLE 4

A slab urethane sheet with a weight per unit area of 30 g/m$^2$ as the intermediate layer 3 is stacked on a nonwoven fabric as the rear surface layer 4 which is a fiber integration with a weight per unit area of 40 g/m$^2$ using 50 wt % of a polyester short fiber and 50 wt % of a bi-component short fiber fabricated by a carding machine as a raw material, and a nonwoven fabric with a weight per unit area of 30 g/m$^2$ as the front surface layer 2 using 50 wt % of the same polyester short fiber and 50 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 100 g/m$^2$ is obtained (Table 1).

EXAMPLE 5

A slab urethane sheet with a weight per unit area of 60 g/m$^2$ as the intermediate layer 3 is stacked on a nonwoven fabric as the rear surface layer 4 which is a fiber integration with a weight per unit area of 40 g/m$^2$ using a polyester short fiber fabricated by a carding machine as a raw material, and a nonwoven fabric with a weight per unit area of 30 g/m$^2$ as the front surface layer 2 using the same polyester short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 130 g/m² is obtained (Table 1).

EXAMPLE 6

A slab urethane sheet with a weight per unit area of 70 g/m² as the intermediate layer 3 is stacked on a nonwoven fabric as the rear surface layer 4 which is a fiber integration with a weight per unit area of 50 g/m² using 50 wt % of a polyester short fiber and 50 wt % of a bi-component short fiber fabricated by a carding machine as a raw material, and a nonwoven fabric with a weight per unit area of 30 g/m² as the front surface layer 2 using 50 wt % of the same polyester short fiber and 50 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 150 g/m² is obtained (Table 1).

EXAMPLE 7

A slab urethane sheet with a weight per unit area of 80 g/m² as the intermediate layer 3 is stacked on a nonwoven fabric as the rear surface layer 4 which is a fiber integration with a weight per unit area of 50 g/m² using 50 wt % of a polyester short fiber and 50 wt % of a bi-component short fiber fabricated by a carding machine as a raw material, and a nonwoven fabric with a weight per unit area of 30 g/m² as the front surface layer 2 using 50 wt % of the same polyester short fiber and 50 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 160 g/m² is obtained (Table 1).

EXAMPLE 8

A slab urethane sheet with a weight per unit area of 100 g/m² as the intermediate layer 3 is stacked on a nonwoven fabric as the rear surface layer 4 which is a fiber integration with a weight per unit area of 40 g/m² using a polyester short fiber fabricated by a carding machine as a raw material, and a nonwoven fabric with a weight per unit area of 30 g/m² as the front surface layer 2 using the same polyester short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 170 g/m² is obtained (Table 1).

EXAMPLE 9

A slab urethane sheet with a weight per unit area of 100 g/m² as the intermediate layer 3 is stacked on a nonwoven fabric as the rear surface layer 4 which is a fiber integration with a weight per unit area of 30 g/m² using a polyester short fiber fabricated by a carding machine as a raw material, and a nonwoven fabric with a weight per unit area of 20 g/m² as the front surface layer 2 using the same polyester short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 150 g/m² is obtained (Table 1).

EXAMPLE 10

A slab urethane sheet with a weight per unit area of 80 g/m² as the intermediate layer 3 is stacked on a nonwoven fabric as the rear surface layer 4 which is a fiber integration with a weight per unit area of 40 g/m² using 50 wt % of a polyester short fiber and 50 wt % of a bi-component short fiber fabricated by a carding machine as a raw material, and a nonwoven fabric with a weight per unit area of 30 g/m² as the front surface layer 2 using 50 wt % of the same polyester short fiber and 50 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 150 g/m² is obtained (Table 1).

EXAMPLE 11

A slab urethane sheet with a weight per unit area of 30 g/m² as the intermediate layer 3 is stacked on a nonwoven fabric as the rear surface layer 4 which is a fiber integration with a weight per unit area of 140 g/m² using 50 wt % of a polyester short fiber and 50 wt % of a bi-component short fiber fabricated by a carding machine as a raw material, and a nonwoven fabric with a weight per unit area of 30 g/m² as the front surface layer 2 using 50 wt % of the same polyester short fiber and 50 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 200 g/m² is obtained (Table 1).

EXAMPLE 12

A slab urethane sheet with a weight per unit area of 30 g/m² as the intermediate layer 3 is stacked on a nonwoven fabric as the rear surface layer 4 which is a fiber integration with a weight per unit area of 150 g/m² using 50 wt % of a polyester short fiber and 50 wt % of a bi-component short fiber fabricated by a carding machine as a raw material, and a nonwoven fabric with a weight per unit area of 30 g/m² as the front surface layer 2 using 50 wt % of the same polyester short fiber and 50 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 210 g/m² is obtained (Table 1).

EXAMPLE 13

A slab urethane sheet with a weight per unit area of 100 g/m² as the intermediate layer 3 is stacked on a nonwoven fabric as the rear surface layer 4 which is a fiber integration with a weight per unit area of 90 g/m² using a polyester short fiber fabricated by a carding machine as a raw material, and a nonwoven fabric with a weight per unit area of 30 g/m² as the front surface layer 2 using the same polyester short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 220 g/m² is obtained (Table 1).

EXAMPLE 14

A slab urethane sheet with a weight per unit area of 30 g/m² as the intermediate layer 3 is stacked on a nonwoven fabric as the rear surface layer 4 which is a fiber integration with a weight per unit area of 190 g/m² using 50 wt % of an ester short fiber and 50 wt % of a bi-component short fiber fabricated by a carding machine as a raw material, and a nonwoven fabric with a weight per unit area of 30 g/m² as the front surface layer 2 using 50 wt % of the same ester short fiber and 50 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 250 g/m² is obtained (Table 1).

EXAMPLE 15

A slab urethane sheet with a weight per unit area of 80 g/m² as the intermediate layer 3 is stacked on a nonwoven fabric as the rear surface layer 4 which is a fiber integration with a weight per unit area of 130 g/m² using 50 wt % of an ester short fiber and 50 wt % of a bi-component short fiber fabricated by a carding machine as a raw material, and a nonwoven fabric with a weight per unit area of 30 g/m² as the front surface layer 2 using 50 wt % of the same ester short fiber and 50 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 240 g/m² is obtained (Table 1).

EXAMPLE 16

A slab urethane sheet with a weight per unit area of 30 g/m² as the intermediate layer 3 is stacked on a nonwoven fabric as the rear surface layer 4 which is a fiber integration with a weight per unit area of 200 g/m² using an ester short fiber fabricated by a carding machine as a raw material, and a nonwoven fabric with a weight per unit area of 30 g/m² as the front surface layer 2 using the same ester short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 260 g/m² is obtained (Table 1).

EXAMPLE 17

A slab urethane sheet with a weight per unit area of 30 g/m² as the intermediate layer 3 is stacked on a nonwoven fabric as the rear surface layer 4 which is a fiber integration with a weight per unit area of 50 g/m² using an ester short fiber fabricated by a carding machine as a raw material, and a nonwoven fabric with a weight per unit area of 30 g/m² as the front surface layer 2 using the same ester short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 110 g/m² is obtained (Table 1).

EXAMPLE 18

A slab urethane sheet with a weight per unit area of 30 g/m² as the intermediate layer 3 is stacked on a nonwoven fabric as the rear surface layer 4 which is a fiber integration with a weight per unit area of 50 g/m² using 70 wt % of an ester short fiber and 30 wt % of a bi-component short fiber fabricated by a carding machine as a raw material, and a nonwoven fabric with a weight per unit area of 30 g/m² as the front surface layer 2 using 70 wt % of the same ester short fiber and 30 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 110 g/m² is obtained (Table 1).

EXAMPLE 19

A slab urethane sheet with a weight per unit area of 30 g/m² as the intermediate layer 3 is stacked on a nonwoven fabric as the rear surface layer 4 which is a fiber integration with a weight per unit area of 50 g/m² using 60 wt % of an ester short fiber and 40 wt % of a bi-component short fiber fabricated by a carding machine as a raw material, and a nonwoven fabric with a weight per unit area of 30 g/m² as the front surface layer 2 using 60 wt % of the same ester short fiber and 40 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 110 g/m² is obtained (Table 1).

EXAMPLE 20

A slab urethane sheet with a weight per unit area of 80 g/m² as the intermediate layer 3 is stacked on a nonwoven fabric as the rear surface layer 4 which is a fiber integration with a weight per unit area of 50 g/m² using 60 wt % of an ester short fiber and 40 wt % of a bi-component short fiber fabricated by a carding machine as a raw material, and a nonwoven fabric with a weight per unit area of 30 g/m² as the front surface layer 2 using 60 wt % of the same ester short fiber and 40 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 160 g/m² is obtained (Table 1).

EXAMPLE 21

A slab urethane sheet with a weight per unit area of 30 g/m² as the intermediate layer 3 is stacked on a nonwoven fabric as the rear surface layer 4 which is a fiber integration with a weight per unit area of 50 g/m² using 40 wt % of an ester short fiber and 60 wt % of a bi-component short fiber fabricated by a carding machine as a raw material, and a nonwoven fabric with a weight per unit area of 30 g/m² as the front surface layer 2 using 40 wt % of the same ester short fiber and 60 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 110 g/m² is obtained (Table 1).

EXAMPLE 22

A slab urethane sheet with a weight per unit area of 30 g/m² as the intermediate layer 3 is stacked on a nonwoven fabric as the rear surface layer 4 which is a fiber integration with a weight per unit area of 50 g/m² using 30 wt % of an ester short fiber and 70 wt % of a bi-component short fiber fabricated by a carding machine as a raw material, and a nonwoven fabric with a weight per unit area of 30 g/m² as the front surface layer 2 using 30 wt % of the same ester short fiber and 70 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 110 g/m² is obtained (Table 1).

EXAMPLE 23

A slab urethane sheet with a weight per unit area of 80 g/m² as the intermediate layer 3 is stacked on a nonwoven fabric as the rear surface layer 4 which is a fiber integration with a weight per unit area of 50 g/m² using 30 wt % of an ester short fiber and 70 wt % of a bi-component short fiber fabricated by a carding machine as a raw material, and a nonwoven fabric with a weight per unit area of 30 g/m² as the front surface layer 2 using 30 wt % of the same ester short fiber and 70 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 160 g/m² is obtained (Table 1).

EXAMPLE 24

A slab urethane sheet with a weight per unit area of 40 g/m² as the intermediate layer 3 is stacked on a nonwoven fabric as the rear surface layer 4 which is a fiber integration with a weight per unit area of 50 g/m² using 30 wt % of an ester short fiber and 70 wt % of a bi-component short fiber fabricated by a carding machine as a raw material, and a nonwoven fabric with a weight per unit area of 100 g/m² as the front surface layer 2 using 30 wt % of the same ester short fiber and 70 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 190 g/m² is obtained (Table 1).

EXAMPLE 25

A slab urethane sheet with a weight per unit area of 40 g/m² as the intermediate layer 3 is stacked on a nonwoven fabric as the rear surface layer 4 which is a fiber integration with a weight per unit area of 50 g/m² using 30 wt % of an ester short fiber and 70 wt % of a bi-component short fiber fabricated by a carding machine as a raw material, and a nonwoven fabric with a weight per unit area of 50 g/m² as the front surface layer 2 using 30 wt % of the same ester short fiber and 70 wt % of the same bi-component short fiber as in the rear surface layer 4 as a raw material is additionally stacked thereon with a long fiber nonwoven fabric formed of a random polypropylene copolymer resin with a weight per unit area of 40 g/m² interposed therebetween. Thereafter, a needle punching process is performed to integrate the layers, whereby a reinforcing base fabric 1 for an urethane-foamed product with a total weight per unit area of 180 g/m² is obtained (Table 1).

EXAMPLE 26

A slab urethane sheet with a weight per unit area of 40 g/m² as the intermediate layer 3 is stacked on a nonwoven fabric as the rear surface layer 4 which is a fiber integration with a weight per unit area of 50 g/m² using 30 wt % of an ester short fiber and 70 wt % of a bi-component short fiber fabricated by a carding machine as a raw material, and a nonwoven fabric with a weight per unit area of 50 g/m² as the front surface layer 2 using 30 wt % of the same ester short fiber and 70 wt % of the same bi-component short fiber as in the rear surface layer 4 as a raw material is additionally stacked thereon with a long fiber nonwoven fabric formed of a random polypropylene copolymer resin with a weight per unit area of 70 g/m² interposed therebetween. Thereafter, a needle punching process is performed to integrate the layers, whereby a reinforcing base fabric 1 for an urethane-foamed product with a total weight per unit area of 210 g/m² is obtained (Table 1).

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|---|
| Front surface layer 2 | Integration | | Short fiber | Short fiber | Short fiber | Short fiber | Short fiber | Short fiber | Short fiber | Short fiber | Short fiber | Short fiber | Short fiber | Short fiber | Short fiber |
| | PET/bi-component | wt % | 50/50 | 50/50 | 50/50 | 50/50 | 100/0 | 50/50 | 50/50 | 100/0 | 100/0 | 50/50 | 50/50 | 50/50 | 100/0 |
| | Melting point | ° C. | 260/150 | 260/150 | 260/150 | 260/150 | 260/150 | 260/150 | 260/150 | 260/150 | 260/150 | 260/150 | 260/150 | 260/150 | 260/150 |
| | Weight per unit area | g/m² | 20 | 30 | 30 | 30 | 30 | 30 | 30 | 30 | 20 | 30 | 30 | 30 | 30 |
| | Weight per unit area of long fiber integration | g/m² | 0 | 0 | 0 | 0 | 0 | 0 | 0 | 0 | 0 | 0 | 0 | 0 | 0 |
| Intermediate layer 3 (slab urethane) | Weight per unit area | g/m² | 30 | 30 | 30 | 30 | 60 | 70 | 80 | 100 | 100 | 80 | 30 | 30 | 100 |
| Rear surface layer 4 | Integration | | Short fiber | Short fiber | Short fiber | Short fiber | Short fiber | Short fiber | Short fiber | Short fiber | Short fiber | Short fiber | Short fiber | Short fiber | Short fiber |
| | PET/bi-component | wt % | 50/50 | 50/50 | 50/50 | 50/50 | 100/0 | 50/50 | 50/50 | 100/0 | 100/0 | 50/50 | 50/50 | 50/50 | 100/0 |
| | Melting point | ° C. | 260/150 | 260/150 | 260/150 | 260/150 | 260/150 | 260/150 | 260/150 | 260/150 | 260/150 | 260/150 | 260/150 | 260/150 | 260/150 |

TABLE 1-continued

|  |  |  |  |  |  |  |  |  |  |  |  |  |  |  |
|---|---|---|---|---|---|---|---|---|---|---|---|---|---|---|
|  | Weight per unit area | g/m² | 50 | 50 | 30 | 40 | 40 | 50 | 50 | 40 | 30 | 40 | 140 | 150 | 90 |
| Total weight per unit area | | g/m² | 100 | 110 | 90 | 100 | 130 | 150 | 160 | 170 | 150 | 150 | 200 | 210 | 220 |
| Total thickness | | mm | 2.2 | 2.3 | 2.1 | 2.2 | 3.7 | 4.3 | 4.8 | 5.7 | 5.5 | 4.7 | 3.2 | 3.3 | 6.2 |
| Evaluation of individual items based on sewing | Difficulty level in fine sewing | | ○ | ○ | ○ | ○ | ○ | Δ | | Δ | Δ | | ○ | Δ | Δ |
| | Shape retainability after processing | | Δ | ○ | Δ | Δ | ○ | ○ | | ○ | ○ | | ○ | ○ | ○ |
| | Fixed state of urethane | | Δ | ○ | ○ | ○ | ○ | ○ | | ○ | Δ | | ○ | ○ | ○ |
| | Permeating state of urethane | | ○ | ○ | ○ | ○ | ○ | ○ | | ○ | ○ | | ○ | ○ | ○ |
| | Noise prevention | | ○ | ○ | Δ | ○ | ○ | ○ | | ○ | Δ | | ○ | ○ | ○ |
| | Bottoming feeling | | ○ | ○ | Δ | ○ | ○ | ○ | | ○ | ○ | | ○ | ○ | ○ |
| | Comprehensive evaluation as reinforcing base fabric | | Δ | ○ | Δ | Δ | ○ | Δ | | Δ | Δ | | ○ | Δ | Δ |
| Evaluation of individual items based on heating and molding | Shape retainability after molding | | Δ | ○ | Δ | Δ | | | ○ | | Δ | Δ | | ○ | ○ |
| | Generation state of creases | | ○ | ○ | ○ | ○ | | | ○ | | ○ | ○ | | ○ | ○ |
| | Adhesiveness of overlapping portion | | ○ | ○ | ○ | ○ | | | ○ | | Δ | Δ | | ○ | Δ |
| | Fixed state of urethane | | Δ | ○ | ○ | ○ | | | ○ | | ○ | ○ | | ○ | ○ |
| | Permeating state of urethane | | ○ | ○ | ○ | ○ | | | ○ | | ○ | ○ | | ○ | ○ |
| | Noise prevention | | ○ | ○ | Δ | Δ | | | ○ | | ○ | ○ | | ○ | ○ |
| | Bottoming feeling | | ○ | ○ | Δ | Δ | | | ○ | | ○ | ○ | | ○ | ○ |
| | Comprehensive evaluation as reinforcing base fabric | | Δ | ○ | Δ | Δ | | | ○ | | Δ | Δ | | ○ | Δ |

| | | | Example No. |||||||||||||
|---|---|---|---|---|---|---|---|---|---|---|---|---|---|---|---|
| | | | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 | Ex. 26 |
| Front surface layer 2 | Integration | | Short fiber | Short fiber | Short fiber | Short fiber | Short fiber | Short fiber | Short fiber | Short fiber | Short fiber | Short fiber | Short fiber | Short fiber | Short fiber |
| | PET/bi-component | wt % | 50/50 | 50/50 | 100/0 | 100/0 | 70/30 | 60/40 | 60/40 | 40/60 | 30/70 | 30/70 | 30/70 | 30/70 | 30/70 |
| | Melting point | °C. | 260/150 | 260/150 | 260/150 | 260/150 | 260/150 | 260/150 | 260/150 | 260/150 | 260/150 | 260/150 | 260/150 | 260/150 | 260/150 |
| | Weight per unit area | g/m² | 30 | 30 | 30 | 30 | 30 | 30 | 30 | 30 | 30 | 30 | 100 | 50 | 50 |
| | Weight per unit area of long fiber integration | g/m² | 0 | 0 | 0 | 0 | 0 | 0 | 0 | 0 | 0 | 0 | 0 | 40 | 70 |
| Intermediate layer 3 (slab urethane) | Weight per unit area | g/m² | 30 | 80 | 30 | 30 | 30 | 30 | 80 | 30 | 30 | 80 | 40 | 40 | 40 |
| Rear surface layer 4 | Integration | | Short fiber | Short fiber | Short fiber | Short fiber | Short fiber | Short fiber | Short fiber | Short fiber | Short fiber | Short fiber | Short fiber | Short fiber | Short fiber |
| | PET/bi-component | wt % | 50/50 | 50/50 | 100/0 | 100/0 | 70/30 | 60/40 | 60/40 | 40/60 | 30/70 | 30/70 | 30/70 | 30/70 | 30/70 |
| | Melting point | °C. | 260/150 | 260/150 | 260/150 | 260/150 | 260/150 | 260/150 | 260/150 | 260/150 | 260/150 | 260/150 | 260/150 | 260/150 | 260/150 |
| | Weight per unit area | g/m² | 190 | 130 | 200 | 50 | 50 | 50 | 50 | 50 | 50 | 50 | 50 | 50 | 50 |
| Total weight per unit area | | g/m² | 250 | 240 | 260 | 110 | 110 | 110 | 160 | 110 | 110 | 160 | 190 | 180 | 210 |
| Total thickness | | mm | 3.7 | 5.6 | 3.8 | 2.3 | 2.3 | 2.3 | 4.8 | 2.3 | 2.3 | 4.8 | 3.5 | 3.4 | 3.7 |
| Evaluation of individual items based on sewing | Difficulty level in fine sewing | | | | Δ | ○ | | | ○ | ○ | | ○ | ○ | ○ | ○ |
| | Shape retainability after processing | | | | ○ | ○ | | | ○ | ○ | | ○ | ○ | ○ | ○ |
| | Fixed state of urethane | | | | ○ | ○ | | | ○ | Δ | | ○ | ○ | ○ | ○ |
| | Permeating state of urethane | | | | ○ | ○ | | | ○ | ○ | | ○ | ○ | ○ | ○ |
| | Noise prevention | | | | ○ | ○ | | | ○ | ○ | | ○ | ○ | ○ | ○ |
| | Bottoming feeling | | | | ○ | ○ | | | ○ | Δ | | ○ | ○ | ○ | ○ |
| | Comprehensive evaluation as reinforcing base fabric | | | | Δ | ○ | | | ○ | Δ | | ○ | ○ | ○ | ○ |

TABLE 1-continued

| Evaluation of individual items based on heating and molding | Shape retainability after molding | ○ | △ | △ | ○ | △ | ○ | ○ | △ | △ | ○ |
|---|---|---|---|---|---|---|---|---|---|---|---|
| | Generation state of creases | △ | △ | ○ | ○ | ○ | ○ | ○ | ○ | ○ | ○ |
| | Adhesiveness of overlapping portion | △ | △ | △ | ○ | △ | ○ | ○ | △ | △ | ○ |
| | Fixed state of urethane | ○ | ○ | ○ | ○ | ○ | ○ | △ | △ | ○ | ○ |
| | Permeating state of urethane | ○ | ○ | ○ | ○ | ○ | ○ | ○ | ○ | ○ | ○ |
| | Noise prevention | ○ | ○ | ○ | ○ | ○ | ○ | ○ | △ | ○ | ○ |
| | Bottoming feeling | ○ | ○ | ○ | ○ | ○ | ○ | △ | △ | ○ | ○ |
| Comprehensive evaluation as reinforcing base fabric | | △ | △ | △ | ○ | △ | ○ | △ | △ | ○ | ○ |

COMPARATIVE EXAMPLE 1

A slab urethane sheet with a weight per unit area of 30 g/m$^2$ as the intermediate layer 3 is stacked on a nonwoven fabric as the rear surface layer 4 which is a fiber integration with a weight per unit area of 20 g/m$^2$ using 50 wt % of an ester short fiber and 50 a bi-component short fiber fabricated by a carding machine as a raw material, and a nonwoven fabric with a weight per unit area of 30 g/m$^2$ as the front surface layer 2 using 50 wt % of the same ester short fiber and 50 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 80 g/m$^2$ is obtained.

COMPARATIVE EXAMPLE 2

A slab urethane sheet with a weight per unit area of 90 g/m$^2$ as the intermediate layer 3 is stacked on a nonwoven fabric as the rear surface layer 4 which is a fiber integration with a weight per unit area of 40 g/m$^2$ using 50 wt % of an ester short fiber and 50 wt % of a bi-component short fiber fabricated by a carding machine as a raw material, and a nonwoven fabric with a weight per unit area of 30 g/m$^2$ as the front surface layer 2 using 50 wt % of the same ester short fiber and 50 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 160 g/m$^2$ is obtained.

COMPARATIVE EXAMPLE 3

A slab urethane sheet with a weight per unit area of 90 g/m$^2$ as the intermediate layer 3 is stacked on a nonwoven fabric as the rear surface layer 4 which is a fiber integration with a weight per unit area of 40 g/m$^2$ using an ester short fiber fabricated by a carding machine as a raw material, and a nonwoven fabric with a weight per unit area of 20 g/m$^2$ as the front surface layer 2 using the same ester short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 140 g/m$^2$ is obtained.

COMPARATIVE EXAMPLE 4

A slab urethane sheet with a weight per unit area of 80 g/m$^2$ as the intermediate layer 3 is stacked on a nonwoven fabric as the rear surface layer 4 which is a fiber integration with a weight per unit area of 30 g/m$^2$ using 50 wt % of an ester short fiber and 50 wt % of a bi-component short fiber fabricated by a carding machine as a raw material, and a nonwoven fabric with a weight per unit area of 30 g/m$^2$ as the front surface layer 2 using 50 wt % of the same ester short fiber and 50 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 140 g/m$^2$ is obtained.

COMPARATIVE EXAMPLE 5

A slab urethane sheet with a weight per unit area of 100 g/m$^2$ as the intermediate layer 3 is stacked on a nonwoven fabric as the rear surface layer 4 which is a fiber integration with a weight per unit area of 100 g/m$^2$ using an ester short fiber fabricated by a carding machine as a raw material, and a nonwoven fabric with a weight per unit area of 30 g/m$^2$ as the front surface layer 2 using the same ester short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 230 g/m$^2$ is obtained.

COMPARATIVE EXAMPLE 6

A slab urethane sheet with a weight per unit area of 30 g/m$^2$ as the intermediate layer 3 is stacked on a nonwoven fabric as the rear surface layer 4 which is a fiber integration with a weight per unit area of 200 g/m$^2$ using 50 wt % of an ester short fiber and 50 wt % of a bi-component short fiber fabricated by a carding machine as a raw material, and a nonwoven fabric with a weight per unit area of 30 g/m$^2$ as the front surface layer 2 using 50 wt % of the same ester short fiber and 50 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 260 g/m$^2$ is obtained.

COMPARATIVE EXAMPLE 7

A slab urethane sheet with a weight per unit area of 80 g/m$^2$ as the intermediate layer 3 is stacked on a nonwoven fabric as the rear surface layer 4 which is a fiber integration with a weight per unit area of 140 g/m$^2$ using 50 wt % of an ester short fiber and 50 wt % of a bi-component short fiber fabricated by a carding machine as a raw material, and a nonwoven fabric with a weight per unit area of 30 g/m² as the front surface layer 2 using 50 wt % of the same ester short fiber and 50 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 250 g/m² is obtained.

COMPARATIVE EXAMPLE 8

A slab urethane sheet with a weight per unit area of 30 g/m² as the intermediate layer 3 is stacked on a nonwoven fabric as the rear surface layer 4 which is a fiber integration with a weight per unit area of 210 g/m² using an ester short fiber fabricated by a carding machine as a raw material, and a nonwoven fabric with a weight per unit area of 30 g/m² as the front surface layer 2 using the same ester short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 270 g/m² is obtained.

COMPARATIVE EXAMPLE 9

A slab urethane sheet with a weight per unit area of 30 g/m² as the intermediate layer 3 is stacked on a nonwoven fabric as the rear surface layer 4 which is a fiber integration with a weight per unit area of 50 g/m² using 80 wt % of an ester short fiber and 20 wt % of a bi-component short fiber fabricated by a carding machine as a raw material, and a nonwoven fabric with a weight per unit area of 30 g/m² as the front surface layer 2 using 80 wt % of the same ester short fiber and 20 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 110 g/m² is obtained.

COMPARATIVE EXAMPLE 10

A slab urethane sheet with a weight per unit area of 80 g/m² as the intermediate layer 3 is stacked on a nonwoven fabric as the rear surface layer 4 which is a fiber integration with a weight per unit area of 50 g/m² using 70 wt % of an ester short fiber and 30 wt % of a bi-component short fiber fabricated by a carding machine as a raw material, and a nonwoven fabric with a weight per unit area of 30 g/m² as the front surface layer 2 using 70 wt % of the same ester short fiber and 30 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 160 g/m² is obtained.

COMPARATIVE EXAMPLE 11

A slab urethane sheet with a weight per unit area of 30 g/m² as the intermediate layer 3 is stacked on a nonwoven fabric as the rear surface layer 4 which is a fiber integration with a weight per unit area of 50 g/m² using 20 wt % of an ester short fiber and 80 wt % of a bi-component short fiber fabricated by a carding machine as a raw material, and a nonwoven fabric with a weight per unit area of 30 g/m² as the front surface layer 2 using 20 wt % of the same ester short fiber and 80 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 110 g/m² is obtained.

COMPARATIVE EXAMPLE 12

A slab urethane sheet with a weight per unit area of 80 g/m² as the intermediate layer 3 is stacked on a nonwoven fabric as the rear surface layer 4 which is a fiber integration with a weight per unit area of 50 g/m² using 20 wt % of an ester short fiber and 80 wt % of a bi-component short fiber fabricated by a carding machine as a raw material, and a nonwoven fabric with a weight per unit area of 30 g/m² as the front surface layer 2 using 20 wt % of the same ester short fiber and 80 wt % of the same bi-component short fiber as in the rear surface layer 4 as a raw material is additionally stacked thereon. Thereafter, a needle punching process is performed to integrate the layers, whereby a reinforcing base fabric 1 for an urethane-foamed product with a total weight per unit area of 160 g/m² is obtained.

TABLE 2

| | | | | | | | Example No. | | | | |
|---|---|---|---|---|---|---|---|---|---|---|---|
| | | | Com. Ex. 1 | Com. Ex. 2 | Com. Ex. 3 | Com. Ex. 4 | Com. Ex. 5 | Com. Ex. 6 | Com. Ex. 7 | Com. Ex. 8 |
| Front surface layer 2 | Integration | | Short fiber | Short fiber | Short fiber | Short fiber | Short fiber | Short fiber | Short fiber | Short fiber |
| | PET/bi-component | wt % | 50/50 | 50/50 | 100/0 | 50/50 | 100/0 | 50/50 | 50/50 | 100/0 |
| | Melting point | °C. | 260/150 | 260/150 | 260/150 | 260/150 | 260/150 | 260/150 | 260/150 | 260/150 |
| | Weight per unit area | g/m² | 30 | 30 | 20 | 30 | 30 | 30 | 30 | 30 |
| | Weight per unit area of long fiber integration | g/m² | 0 | 0 | 0 | 0 | 0 | 0 | 0 | 0 |
| Intermediate layer 3 (slab urethane) | Weight per unit area | g/m² | 30 | 90 | 100 | 80 | 100 | 30 | 80 | 30 |

TABLE 2-continued

| | | | | | | | | | | |
|---|---|---|---|---|---|---|---|---|---|---|
| Rear surface layer 4 | Integration | | Short fiber | Short fiber | Short fiber | Short fiber | Short fiber | Short fiber | Short fiber | Short fiber |
| | PET/hi-component | wt % | 50/50 | 50/50 | 100/0 | 50/50 | 100/0 | 50/50 | 50/50 | 100/0 |
| | Melting point | °C. | 260/150 | 260/150 | 260/150 | 260/150 | 260/150 | 260/150 | 260/150 | 260/150 |
| | Weight per unit area | g/m² | 20 | 40 | 20 | 30 | 100 | 200 | 140 | 210 |
| Total weight per unit area | | g/m² | 80 | 160 | 140 | 140 | 230 | 260 | 250 | 270 |
| Total thickness | | mm | 2 | 5.2 | 5.4 | 4.6 | 6.3 | 3.8 | 5.7 | 3.9 |
| Evaluation of individual items based on sewing | Difficulty level in fine sewing | | Δ | | Δ | | X | | | X |
| | Shape retainability after processing | | X | | ○ | | X | | | X |
| | Fixed state of urethane | | ○ | | Δ | | Inappropriate | | | Inappropriate |
| | Permeating state of urethane | | ○ | | ○ | | Inappropriate | | | Inappropriate |
| | Noise prevention | | X | | X | | Inappropriate | | | Inappropriate |
| | Bottoming feeling | | Δ | | ○ | | Inappropriate | | | Inappropriate |
| | Comprehensive evaluation as reinforcing base fabric | | X | | X | | X | | | X |
| Evaluation of individual items based on heating and molding | Shape retainability after molding | | X | Δ | | X | | ○ | Δ | |
| | Generation state of creases | | ○ | ○ | | ○ | | Δ | X | |
| | Adhesiveness of overlapping portion | | X | X | | Δ | | X | X | |
| | Fixed state of urethane | | ○ | ○ | | ○ | | ○ | ○ | |
| | Permeating state of urethane | | ○ | ○ | | ○ | | ○ | ○ | |
| | Noise prevention | | X | ○ | | Δ | | ○ | ○ | |
| | Bottoming feeling | | Δ | ○ | | Δ | | ○ | ○ | |
| | Comprehensive evaluation as reinforcing base fabric | | X | X | | X | | X | X | |

| | | | Example No. | | | |
|---|---|---|---|---|---|---|
| | | | Com. Ex. 9 | Com. Ex. 10 | Com. Ex. 11 | Com. Ex. 12 |
| Front surface layer 2 | Integration | | Short fiber | Short fiber | Short fiber | Short fiber |
| | PET/bi-component | wt % | 80/20 | 70/30 | 20/80 | 20/80 |
| | Melting point | °C. | 260/150 | 260/150 | 260/150 | 260/150 |
| | Weight per unit area | g/m² | 30 | 30 | 30 | 30 |
| | Weight per unit area of long fiber integration | g/m² | 0 | 0 | 0 | 0 |
| Intermediate layer 3 (slab urethane) | Weight per unit area | g/m² | 30 | 80 | 30 | 80 |
| Rear surface layer 4 | Integration | | Short fiber | Short fiber | Short fiber | Short fiber |
| | PET/hi-component | wt % | 80/20 | 70/30 | 20/80 | 20/80 |
| | Melting point | °C. | 260/150 | 260/150 | 260/150 | 260/150 |
| | Weight per unit area | g/m² | 50 | 50 | 50 | 50 |
| Total weight per unit area | | g/m² | 110 | 160 | 110 | 160 |
| Total thickness | | mm | 2.3 | 4.8 | 2.3 | 4.8 |
| Evaluation of individual items based on sewing | Difficulty level in fine sewing | | | | ○ | |
| | Shape retainability after processing | | | | ○ | |
| | Fixed state of urethane | | | | Δ | |
| | Permeating state of urethane | | | | ○ | |
| | Noise prevention | | | | Δ | |
| | Bottoming feeling | | | | X | |

TABLE 2-continued

|  |  |  |  |  |  |
|---|---|---|---|---|---|
|  | Comprehensive evaluation as reinforcing base fabric |  |  | X |  |
| Evaluation of individual items based on heating and molding | Shape retainability after molding | X | X | ○ | ○ |
|  | Generation state of creases | Unclear | Unclear | ○ | ○ |
|  | Adhesiveness of overlapping portion | X | X | ○ | Δ |
|  | Fixed state of urethane | Inappropriate | Inappropriate | Δ | Δ |
|  | Permeating state of urethane | Inappropriate | Inappropriate | ○ | ○ |
|  | Noise prevention | Inappropriate | Inappropriate | Δ | Δ |
|  | Bottoming feeling | Inappropriate | Inappropriate | X | X |
|  | Comprehensive evaluation as reinforcing base fabric | X | X | X | X |

Preparation of Test Sample

The reinforcing base fabrics 1 for an urethane-foamed product which have been obtained as described above were evaluated using techniques corresponding to two types of processing methods of the sewing method and the heating and molding method. When the reinforcing base fabrics 1 for an urethane-foamed product are prepared using the sewing method and are evaluated, the reinforcing base fabrics 1 for an urethane-foamed product obtained in the examples and the comparative examples were cut in a predetermined shape and were sewn by a sewing machine to prepare the reinforcing base fabrics 7. Thereafter, urethane foaming was performed at 120° C. for 15 minutes to prepare test samples. When the reinforcing base fabrics 1 for an urethane-foamed product are prepared using the heating and molding method and are evaluated, the reinforcing base fabrics 1 for an urethane-foamed product obtained in the examples and the comparative examples were subjected to preliminary molding (by performing vacuum molding after preheating the reinforcing base fabrics at 130° C. to 150°. Thereafter, urethane foaming was performed at 120° C. for 15 minutes to prepare test samples. The test samples or samples cut out therefrom were evaluated in the following items as the evaluation of the reinforcing base fabrics 1 for an urethane-foamed product.

Evaluation Items and Evaluation Methods

When the sewing method was used, a difficulty level in sewing was evaluated by evaluating easiness of sewing using a sewing machine with a hand's sense and visually evaluating detailed sewn states. The shape retainability after being processed was evaluated by visually evaluating a shape-retained state of the reinforcing base fabrics 7 after being sewn and evaluating easiness of setting the reinforcing base fabric into an urethane-foaming mold with a hand's sense. The fixability to urethane was evaluated by visually evaluating a fixing state of the front surface layer 2 to the urethane pad layer 5. The urethane permeation prevention was evaluated by visually evaluating the permeating state and the degree of permeation of urethane into the rear surface layer 4. The noise prevention was evaluated by auditorily evaluating a degree of generation of noise when a metal piece was bonded to the rear surface layer 4. The bottoming feeling was evaluated by sensorially evaluating stability felt when the top of the urethane pad layer 5 was pressed down with a hand and a person directly sits thereon in a state in which the rear surface layer 4 of the test sample came in contact with a metal pipe of a frame formed of the metal pipe.

When the heating and molding method was used, the shape retainability after being molded was evaluated by visually evaluating a shape-retained state of the reinforcing base fabrics 7 after being preliminarily molded and evaluating easiness of setting the reinforcing base fabrics into an urethane-foaming mold with a hand's sense. The formation of creases was evaluated by visually evaluating presence of creases and crease states in the shape after being preliminarily molded. The bondability of an overlapped portion was evaluated by evaluating the bonding state of the overlapped portion of the reinforcing base fabrics 7 after being preliminarily molded. The fixability to urethane was evaluated by visually evaluating a fixing state of the front surface layer 2 to the urethane pad layer 5. The urethane permeation prevention was evaluated by visually evaluating the permeating state and the degree of permeation of urethane into the rear surface layer 4. The noise prevention was evaluated by auditorily evaluating a degree of generation of noise when a metal piece was bonded to the rear surface layer 4. The bottoming feeling was evaluated by sensorially evaluating stability felt when the top of the urethane pad layer 5 was pressed down with a hand and a person directly sits thereon in a state in which the rear surface layer 4 of the test sample came in contact with a metal pipe of a frame formed of the metal pipe.

Evaluation Level

The evaluation results were indicated by three steps of levels of O to X and were arranged in Table 1 and Table 2. O indicates a level which is excellent and satisfactory, Δ indicates a level which is substantially satisfactory, and X indicates a level which is not satisfactory.

CONCLUSION

From the evaluations of the examples and the comparative examples, it can be seen that urethane does not permeate out, noise is not generated, and the shape retainability is good, when the reinforcing base fabric 1 for an urethane-foamed product has a total weight per unit area of 90 g/m$^2$ to 260 g/m$^2$, the front surface layer 2 is formed of a fiber integration with a weight per unit area of 20 g/m$^2$ or more, the rear surface layer 4 is formed of a fiber integration with a weight per unit area of 30 g/m$^2$ or more, and the intermediate layer 3 is formed of a foam with a weight per unit area of 30 g/m$^2$ to 100 g/m$^2$. By mixing a resin fiber with a low melting point into the fiber integration of the front surface layer 2 and the rear surface layer 4, it can be seen that the reinforcing base fabric 1 for an urethane-foamed product can be heated and molded such that urethane does not permeate out, noise is not generated, and the shape retainability is good, when the reinforcing base fabric for an urethane-foamed product has a total weight per unit area of 90 g/m$^2$ to 260 g/m$^2$, the front surface layer 2 is formed of a fiber integration with a weight per unit area of 20 g/m² or more, the rear surface layer 4 is formed of a fiber integration with a weight per unit area of 30 g/m² or more, and the intermediate layer 3 is formed of a foam with a weight per unit area of 30 g/m² to 100 g/m².

As described with reference to the embodiment in the above, according to a first aspect of the present disclosure, there is provided a reinforcing base fabric for an urethane-foamed product including: a front surface layer and a rear surface layer formed of a fiber integration of a thermoplastic resin; and an intermediate layer formed of a foam and interposed between the front surface layer and the rear surface layer, wherein the total weight per unit area ranges from 90 g/m² to 260 g/m², wherein the front surface layer is formed of a fiber integration having a weight per unit area of equal to or greater than 20 g/m², wherein the rear surface layer is formed of a fiber integration having a weight per unit area of equal to or greater than 30 g/m², and wherein the intermediate layer is formed of a foam layer having a weight per unit area of 30 g/m² to 100 g/m².

According to the first aspect, since the reinforcing base fabric for an urethane-foamed product employs a foam layer having less unevenness in material density per unit area as the intermediate layer, it is possible to prevent permeation of the urethane material and to suppress noise which is generated by friction between a metal spring or the like and the urethane resin. Since the total weight per unit area of the reinforcing base fabric is not excessively large and the front surface layer and the rear surface layer are formed of a fiber integration of a thermoplastic resin, it is possible to easily follow a mold shape through preliminary molding using a heating and molding process or the like and to suppress breakage or generation of creases.

A second aspect of the present disclosure is the reinforcing base fabric for an urethane-foamed product according to the first aspect, wherein the fiber integration of the front surface layer and the rear surface layer is a short fiber integration, wherein the intermediate layer is a foam layer of a polyurethane resin, and wherein the front surface layer, the rear surface layer, and the intermediate layer are integrated by a needle-punching method.

According to the second aspect, since the intermediate layer is a foam layer of a polyurethane resin, the material density per unit area is less uneven and it is thus possible to further effectively prevent permeation of the urethane material. Since the fiber integration of the front surface layer and the rear surface layer is a short fiber integration, it is possible to more easily follow a mold shape through preliminary molding using a heating and molding process.

A third aspect of the present disclosure is the reinforcing base fabric for an urethane-foamed product according to the second aspect, wherein the fiber integration of the front surface layer and the rear surface layer is a fiber mixture of a fiber including a thermoplastic resin having a melting point of 200° C. or higher and a fiber including a thermoplastic resin having a melting point of 150° C. or lower or a bi-component fiber in which a thermoplastic resin having a melting point of 200° C. or higher and a thermoplastic resin having a melting point of 150° C. or lower, wherein a mixing ratio of the thermoplastic resin having a melting point of 200° C. or higher and the thermoplastic resin having a melting point of 150° C. or lower ranges from 70%/30% to 30%/70%, wherein the total weight per unit area of the reinforcing base fabric for an urethane-foamed product ranges from 90 g/m² to 240 g/m², and wherein the weight per unit area of the intermediate layer ranges from 30 g/m² to 80 g/m².

According to the third aspect, Since the fiber integration of the front surface layer and the rear surface layer includes the thermoplastic resin having a melting point of 200° C. or higher and the thermoplastic resin having a melting point of 150° C. or lower, it is possible to allow a reinforcing effect and heating and molding workability to coexist.

What is claimed is:

1. A reinforcing base fabric for an urethane-foamed product comprising:
    a front surface layer and a rear surface layer comprising a fiber integration of a thermoplastic resin; and
    an intermediate layer comprising an open cell foam and interposed between the front surface layer and the rear surface layer,
    wherein the total weight per unit area ranges from 90 g/m² to 260 g/m²,
    wherein the fiber integration of the front surface layer has a weight per unit area of equal to or greater than 20 g/m²,
    wherein the fiber integration of the rear surface layer has a weight per unit area of equal to or greater than 30 g/m², and
    wherein the intermediate layer comprises the open cell foam layer having a weight per unit area of 30 g/m² to 100 g/m².

2. The reinforcing base fabric for an urethane-foamed product according to claim 1,
    wherein the fiber integration of the front surface layer and the rear surface layer is a short fiber integration,
    wherein the intermediate layer is a foam layer of a polyurethane resin, and
    wherein the front surface layer, the rear surface layer, and the intermediate layer are integrated by a needle-punching method.

3. The reinforcing base fabric for an urethane-foamed product according to claim 2,
    wherein the fiber integration of the front surface layer and the rear surface layer is a fiber mixture of a fiber including a thermoplastic resin having a melting point of 200° C. or higher and a fiber including a thermoplastic resin having a melting point of 150° C. or lower or a bi-component fiber in including a thermoplastic resin having a melting point of 200° C. or higher and a thermoplastic resin having a melting point of 150° C. or lower,
    wherein a mixing ratio of the thermoplastic resin having a melting point of 200° C. or higher and the thermoplastic resin having a melting point of 150° C. or lower ranges from 70%/30% to 30%/70%,
    wherein the total weight per unit area of the reinforcing base fabric for the urethane-foamed product ranges from 90 g/m² to 240 g/m², and
    wherein the weight per unit area of the intermediate layer ranges from 30 g/m² to 80 g/m².

* * * * *